Oct. 18, 1949.  D. H. GREEN  2,485,282
PROCESS FOR THE MANUFACTURE
OF ZIGZAG METAL ELEMENTS
Filed Oct. 12, 1944
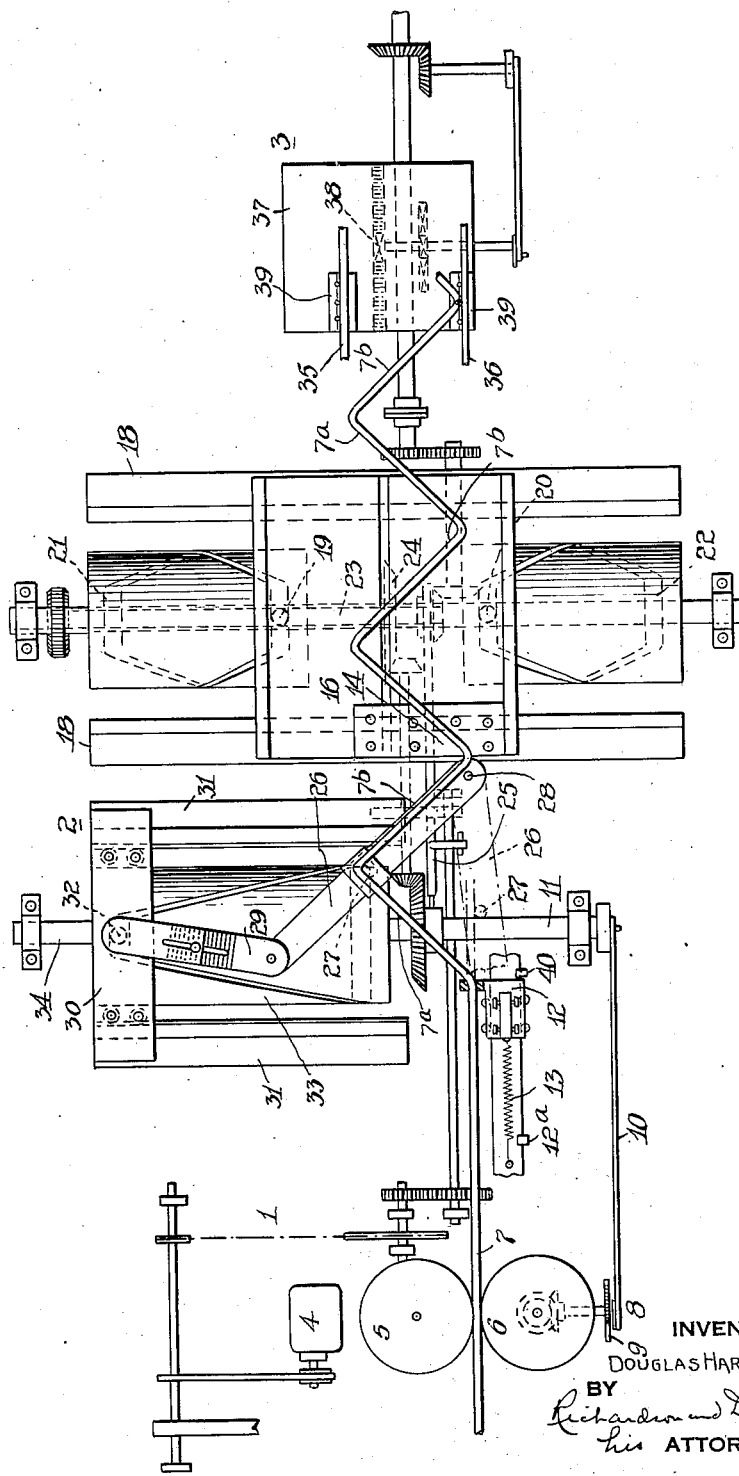
INVENTOR
DOUGLAS HAROLD GREEN
BY
Richardson and David
his ATTORNEYS.

– – – – – – – – – – – – – – – – – – – – – – – – – – – – – –

UNITED STATES PATENT OFFICE 2,485,282

PROCESS FOR THE MANUFACTURE OF ZIGZAG METAL ELEMENTS

Douglas Harold Green, London, England

Application October 12, 1944, Serial No. 558,311
In Great Britain July 29, 1943

4 Claims. (Cl. 153—20)

This invention relates to the manufacture of structural members of the kind consisting of two or more boom or like elements, which may be round rods or bars of various sections such as flats, angles or T's, joined together by means of one or more continuous lattice elements each consisting of a rod or bar of any desired section bent into symmetrical zig-zag form.

It is usual to bend such lattice elements by hand tools and to fabricate the structural members by a series of independent arc or spot welds.

An object of this invention is to provide an improved method of shaping the lattice elements, which is applicable to elements which are too long to be conveniently bent by hand.

A further object is to provide an improved method of assembling and fabricating the boom elements and the lattice element into the finished structural member.

A third object is to provide apparatus adapted to carry out the improved methods.

According to this invention in one aspect, the bar or rod stock intended to form the lattice element is bent into zig-zag form by feeding the stock longitudinally in a succession of equal steps, and in the interval between each two successive feeding steps bending the stock simultaneously about three fulcrums, the first of which is fixed, the second of which moves in a plane containing the stock and in a circular arc about the fixed fulcrum, the radius of the arc being equal to the length of an arm of the zig-zag, and the third of which moves in the direction longitudinally of the stock through a distance equal to the difference between the sum of the arm lengths forming a bend of the zig-zag and the pitch of the zig-zag, the second fulcrum being between the first and the third. Thus at each bending step the stock is bent through the V angle of the zig-zag at the second fulcrum and through half this angle in the reverse direction at each of the first and third fulcrums. The fixed fulcrum may be at the forward end of the three fulcrums in the direction of feeding, in which case in forming a zig-zag of usual form in which the two arms of a bend are of equal length, the stock is fed in each feeding step through a distance equal to the pitch of the zig-zag, and in each bending step it is fed by the movement of the third fulcrum through a distance equal to the difference between twice the arm length of the zig-zag and its pitch.

It is thus apparent that one series of alternate bends in the stock, i. e. those at one side of the zig-zag when formed, are completed in one bending step, while the remaining series of alternate bends are completed in two equal increments made in two successive bending steps.

According to the invention in a further aspect, a structural member of the kind hereinbefore specified is assembled by feeding a pair of boom elements longitudinally while spaced at their intended final spacing, forming the lattice stock into the lattice element while feeding it parallel to the boom elements, the lattice being formed in a plane parallel and close to the plane containing the boom elements, causing the feed paths of the boom elements and the lattice elements to converge to a common plane, and welding the bends of the lattice element successively to the boom elements in said common plane.

Apparatus for use in shaping lattice and the production of structural members in accordance with this invention is illustrated diagrammatically by way of example in the accompanying drawing, the single figure of which is a top plan view of an apparatus according to the invention.

Referring to the drawing, the apparatus comprises feed mechanism designated by the general reference 1 for feeding stock bar intermittently to bending mechanism designated by 2 for producing the zig-zag lattice, and mechanism 3 for bringing the zig-zag lattice and appropriate boom elements into required relative positions and joining as by welding to produce a structural member, the whole being driven by a motor 4.

The feed mechanism consists of a pair of feed wheels 5 and 6 adapted to engage and feed the stock bar 7, usually of round section. The feed wheels 5 and 6, and consequently the bar 7 are moved intermittently and in equal successive steps by the engagement of a reciprocating pawl 8 with a ratchet wheel 9 fast on a shaft geared to one of said feed wheels, the pawl 8 being moved by a coupling rod 10 connected with a rotating part 11 of the driving transmission.

The stock bar 7 is passed through an aperture in a block 12 mounted for sliding movements in guides on the base of the machine and in the longitudinal direction of the unbent bar 7. The unbent bar is capable of sliding within the aperture in the sliding block 12 and a spring 13 is provided tending to move the block 12 in its guides in the direction towards the feed wheels 5, 6, the extent of the movement of the sliding block in this direction being determined by an adjustable stop 12a.

The stock bar 7 extends from said sliding block 12 through a pair of jaws 14, 15 which in the case illustrated are located at one side of and form part of clamping members 16, 17 having zig-zag interengaging faces adapted to clamp already bent portions of the bar 7 between them. These clamping members 16, 17 are arranged for sliding movements towards and away from one another in guides 18 and in predetermined timed relationship with the stock feeding means, to permit the bar 7 to be clamped between them or to pass freely through them as the formation of the zig-zag lattice proceeds. For this purpose the sliding clamping members 16, 17 are provided with pins 19, 20 engaging in cam grooves 21, 22, provided in cylindrical blocks mounted upon a spindle 23 disposed transversely of the clamping members 16, 17 and driven through suitable gearing 24 from the driving mechanism under the control of a clutch 25.

Between the sliding block 12 and the jaws 14, 15 is mounted a lever 26 bearing a transversely extending pin 27 adapted to engage with the underside of the bar 7. The pivot 28 of lever 26 is disposed close to the jaws 14, 15 when the clamping members are in the gripping position, and the lever is arranged to make rocking movements in the plane containing the bar 7 through a link 29 connected between the end of said lever 26 and a sliding block 30 mounted to slide parallel to itself on guides 31 through the engagement of a pin 32 in a cam slot formed in a cylindrical body 33 on a shaft 34 disposed transversely of the machine and adapted to be driven intermittently and in timed relationship with the stock feeding mechanism.

The link 29 is formed in two parts to enable the overall length to be adjusted and thereby the length of the angular movement of pin 27 on lever 26 to be varied.

In operation, with the clamping members 16, 17 and therefore jaws 14, 15 open and lever 26 in the lowered position in which the pin 27 is below the line of the unbent stock bar 7, and sliding block 12 held in its fully retracted position to the left in the drawing against stop 12a, the feed wheels 5, 6 are rotated and the stock bar fed to the right in the drawing for a distance corresponding to the pitch of the zig-zag lattice to be formed. The bar 7 slides through the block 12 and an unbent length of bar extends between the block 12 and the jaws 14, 15 of the clamping members 16, 17. In the case illustrated, previously bent portions of the bar 7 move at the same time into register with the zig-zag surfaces of the clamping members 16, 17.

The clamping members now close so that the unbent portion of the bar is firmly held at one end between the jaws 14, 15 and thereupon the lever 26 is caused to rock in the clockwise direction in the drawing so that pin 27 engages the bar at the point where a bend is to be made and the bar drawn into the position shown.

Engagement of pin 27 with the bar 7 causes deflection thereof such that the bar locks in the aperture in the sliding block 12 so that the latter moves longitudinally in its guides with the bar and to an extent represented by the difference between the pitch of the zig-zag and the sum of the lengths of the two arms 7a and 7b of the complete bent section. During this movement the ratchet and pawl mechanism 8 and 9 permits the feed wheels 5 and 6 to rotate with the moving bar. The stock is gripped to the block 12 as soon as bending commences so that the block moves with the stock against spring 13. Immediately the bending tension is removed the block makes a sliding return along unbent stock under the pull of the spring.

Thus the bar 7 is bent simultaneously about three fulcrums the first of which is fixed, being formed by the upper member of the jaws 14, 15, the second of which is the pin 27 moved in the plane containing the bar 7, through a circular arcuate path about pivot 28 which is substantially co-incident with the fixed fulcrum 14, and the radius of which is equal to the length of an arm 7b of the zig-zag, and the third is the sliding block 12 moved in the longitudinal direction of the stock through a distance equal to the difference between the pitch of the zig-zag and sum of the arm length 7a and 7b, the pin 27 being between the jaws 14, 15 and the sliding block.

In the preferred arrangement the sliding block 12 at the end of its forward travel engages a positive stop 40 so that as pin 27 completes its arcuate travel tension is imparted to the V-shaped portion between the fulcrums 14 and 12.

The lever 26 is next rocked to lower the pin 27 and as tension of the bar 7 is released the sliding block 12 is freed from its gripping engagement with the bar and is returned to its original position against stop 12a by return spring 13. The clamping members 16, 17 move apart to free the stock and the previously described cycle of operations is repeated.

It will readily be seen that alternate bends, i. e. those made at the point of contact of pin 27 with the bar, are completed in one bending step while the remaining alternate bends are completed in two equal increments at the fulcrums 14 and 12 in two successive bending steps.

To assemble the formed lattice into a structural element a pair of boom members 35, 36 in the form of round rods or bars of various sections such as flats, angles or tees are arranged parallel to one another and in spaced relationship corresponding to the width of the zig-zag lattice and in a plane generally parallel to that containing the formed zig-zag lattice. Beyond the output side of the lattice forming mechanism is provided a table 37 adapted to be moved to and fro in the direction of movement of the lattice forming stock bar 7 through engagement of an oscillating pinion 38 with a rack on the underside of the table 37, said pinion being driven in timed relationship with the lattice forming mechanism.

On the surface of the table 37 are provided clamps 39 adapted to be opened and closed, again in timed relationship. The booms to be joined to the lattice extend across the table 37 and are gripped by the clamps 39 and moved forwardly as the table is moved in the forward direction, the booms however being freed from the clamps during return movement of the table so that a step-by-step movement is imparted to the booms.

The formed lattice emerging from between the clamping members 16, 17 extends across the table 37 between the boom elements 35, 36, the table, boom elements and lattice moving in unison by virtue of the grip of the clamps 39 on the booms and previously made connections between the booms and the lattice.

During the periods while lattice bending operations are proceeding and all feeding movements have ceased the bends of the lattice brought into contact with the booms are resistance spot or otherwise welded thereto by suitably located welding means (not shown).

In some cases the feeding wheels 5, 6 for the stock bar may be omitted, feed of the stock and formed lattice being effected by the reciprocating table 37 alone by virtue of the clamps 39 which engage the booms and the welded connections between the booms and the lattice.

A pair of structural elements produced by the above described method and apparatus may by a similar method and apparatus, be united by a third lattice to form a U or triangular section structural member or again a U section member may with the aid of a fourth lattice be given a box section.

I claim:

1. Apparatus for the production of continuous zig-zag lattice elements from rod or bar stock, comprising means for feeding a stock bar longitudinally in a succession of steps, clamping means for holding stationary one end of a section of stock bar to be bent, said clamping means forming a fixed fulcrum, a second fulcrum forming member adapted to engage said section of the stock bar and to move in an arcuate path substantially about said fixed fulcrum, the radius of the arc being equal to the length of an arm of the zig-zag lattice to be formed and a third longitudinally movable fulcrum forming member adapted to make gripping engagement with the stock bar and to constrain the part of the stock bar engaged thereby to move longitudinally therewith during the bending operation towards the fixed fulcrum, the said second fulcrum forming member being between the fixed and the longitudinally movable fulcrum.

2. Apparatus for the production of continuous zig-zag lattice elements from rod or bar stock, comprising means for feeding a stock bar longitudinally in a succession of steps, clamping means for holding stationary one end of a section of stock bar to be bent, said clamping means forming a fixed fulcrum, a second fulcrum forming member adapted to engage said section of the stock bar and to move in an arcuate path substantially about said fixed fulcrum, the radius of the arc being equal to the length of an arm of the zig-zag lattice to be formed and a third longitudinally movable fulcrum forming member adapted to make gripping engagement with the stock bar and to constrain the part of the stock bar engaged thereby to move longitudinally therewith during the bending operation towards the fixed fulcrum, the said second fulcrum forming member being between the fixed and the longitudinally movable fulcrum and means to limit the extent of movement permitted to the longitudinally movable fulcrum and the part of the stock engaged thereby to the difference between the sum of the arm length forming a bend of the zig-zag and the pitch of the zig-zag.

3. The method of shaping continuous zig-zag lattice elements from rod or bar stock for use in the manufacture of structural members, which consists in feeding the stock longitudinally in a succession of steps, and in the intervals between steps, bending the stock at three points simultaneously by gripping the stock at two spaced points distant from one another by a length corresponding to the sum of the lengths of the arms forming a bend of the zig-zag to be formed and applying pressure to a further point on the stock which is intermediate said two spaced and gripped points while restraining one of said spaced and gripped points against movement and constraining the other of said spaced and gripped points to follow a longitudinal path, said further intermediate point being moved over an arc about that one of the two spaced and gripped points which is restrained against movement, the radius of said arc being equal to the length of an arm of the required zig-zag and the length of said arc being such that a complete bend is executed at said further intermediate point and partial bends are executed at said two spaced and gripped points in each successive interval between the stock feeding steps.

4. The method of shaping continuous zig-zag lattice elements from rod or bar stock for use in the manufacture of structural members, which consists in feeding the stock longitudinally in a succession of steps, and in the intervals between steps, bending the stock at three points simultaneously by gripping the stock at two spaced points distant from one another by a length corresponding to the sum of the lengths of the arms forming a bend of the zig-zag to be formed and applying pressure to a further point on the stock which is intermediate said two spaced and gripped points while restraining one of said spaced and gripped points against movement and constraining the other to follow a longitudinal path restricted in length to the difference between the sum of the arm lengths forming a bend of the zig-zag and the pitch of the zig-zag, said further intermediate point being moved over an arc about that one of the two spaced and gripped points which is restrained against movement, the radius of said arc being equal to the length of an arm of the required zig-zag and the length of said arc being such that a complete bend is executed at said further intermediate point and partial bends are executed at said two spaced and gripped points and the stock extending between the two spaced and gripped points and the further intermediate point subjected to tension as said one complete and two partial bends are executed in each successive interval between the stock feeding steps.

DOUGLAS HAROLD GREEN.

REFERENCES CITED

The following references are of record in the file of this patent:

UNITED STATES PATENTS

| Number | Name | Date |
|---|---|---|
| 343,962 | Mack | June 15, 1886 |
| 1,683,366 | McComber | Sept. 4, 1928 |
| 2,004,409 | Hopkin | June 11, 1935 |